United States Patent [19]

Finkler et al.

[11] Patent Number: 4,658,412
[45] Date of Patent: Apr. 14, 1987

[54] X-RAY DIAGNOSTIC APPARATUS

[75] Inventors: Klaus Finkler; Hans-Dieter Wolf, both of Erlangen, Fed. Rep. of Germany

[73] Assignee: Siemens Aktiengesellschaft, Berlin and Munich, Fed. Rep. of Germany

[21] Appl. No.: 720,320

[22] Filed: Apr. 5, 1985

[30] Foreign Application Priority Data

Jun. 8, 1984 [DE] Fed. Rep. of Germany ....... 3421461

[51] Int. Cl.⁴ ............................................... H05G 1/60
[52] U.S. Cl. ...................................... 378/99; 378/100; 358/111; 364/414
[58] Field of Search .......................... 378/99, 100, 901; 358/111; 364/414; 128/654

[56] References Cited

U.S. PATENT DOCUMENTS 4,398,213 8/1983 Haendle ................................. 378/99
4,436,095 3/1984 Kruger ................................... 378/99
4,536,790 8/1985 Kruger et al. ......................... 378/99

Primary Examiner—Craig E. Church
Assistant Examiner—Constantine Hannaher
Attorney, Agent, or Firm—Mark H. Jay

[57] ABSTRACT

X-ray diagnostic apparatus is disclosed having a video camera, at least one image memory, a differential stage to produce substraction images by forming the difference between a stored video signal and a video signal chronologically following the former signal, an evaluation circuit for the time evaluation of changes in the subtraction images, and a video monitor. The evaluation circuit includes a time memory for storing information about the chronological flow of the radiographic contrast medium. The evaluation circuit also includes an additional circuit that repeatedly scans the information stored in the time memory and reproduces only those of the image points on the monitor whose information meet a specified criterion. The value of this criterion is increased step-by-step.

2 Claims, 3 Drawing Figures

X-RAY DIAGNOSTIC APPARATUS

BACKGROUND OF THE INVENTION

The invention relates to x-ray diagnostic apparatus utilizing a video camera; at least one image memory; a subtraction stage for producing a difference signal representing the difference between a stored video signal and a video signal which chronologically follows the stored video signal; a circuit for evaluating the time variation in the difference signal and a video monitor for displaying the processed x-ray images. The evaluation circuit in this diagnostic apparatus comprises a time memory that can be used to store information about the chronological progression of the contrast medium. Subtraction images are used for x-rays, especially for selective angiography, to make clearly visible blood vessels that are difficult to recognize in a normal x-ray picture or are located behind bone structures.

The U.S. Pat. No. 4,398,213 discloses x-ray diagnostic apparatus in which an evaluation circuit recognizes the chronological occurrence of changes in the differential image and reads the respective pieces of time information into a time memory. These pieces of time information consist of numerical values, and the magnitude of the stored numerical values characterizes the chronological occurrence of the maximum of the contrast medium flow. A color converter coupled to the memory converts these numerical values into video signals of different colors, which are then reproduced on a color video monitor. The progression of the contrast medium with respect to its position and the chronological occurrence of its maximum can be observed on the monitor, with the aid of this color image. For example, a blood vessel through which the contrast medium is flowing is shown in color and the red image dots may signal an early point in time, while the blue image dots represent the end of the contrast medium flow. Thus only the total, colored image can be seen upon the completion of the x-ray photography. A repeated representation of the flow of the contrast medium is impossible. Furthermore, a color monitor must be available in each case for the correct evaluation of such a subtraction image.

SUMMARY OF THE INVENTION

A principal object of the invention is to provide x-ray diagnostic apparatus of the type described above, which permits a dynamic representation of the contrast medium flow and therefore a presentation also on a black and white (monochrome) video monitor.

This object, as well as other objects which will become apparent from the discussion that follows, are achieved, according to the invention, in that the evaluation circuit also contains a circuit which repeatedly scans the information stored in the time memory and produces only those image dots on the monitor representing numbers that conform to a specific criterion; that is, numbers whose value has increased in steps above the preceding numbers. After the chronological evaluation of the contrast medium flow, this flow may be repeatedly presented on the monitor at any desired rate. This process may be carried out, for example, on a black and white monitor, in which case the image dots representing the progression of the contrast medium are shown on the monitor in white and the others in black; alternatively, gray scales may be used for displaying the respective time values. If a color monitor and a color converter are used, as are known from the U.S. Pat. No. 4,398,213, the time value information can be converted into color information.

The construction of the circuit is simplified if a comparator is provided having one input coupled to the time memory and a second input connected to a counter which receives timing pulses. A controlled drive amplifier, connected to the output of the comparator, reproduces those image dots on the monitor having an information value not exceeding the value at the counter output.

For a full understanding of the present invention, reference should now be made to the following detailed description of the preferred embodiment of the invention and to the accompanying drawing.

DESCRIPTION OF THE PREFERRED EMBODIMENTS

Figure 1:
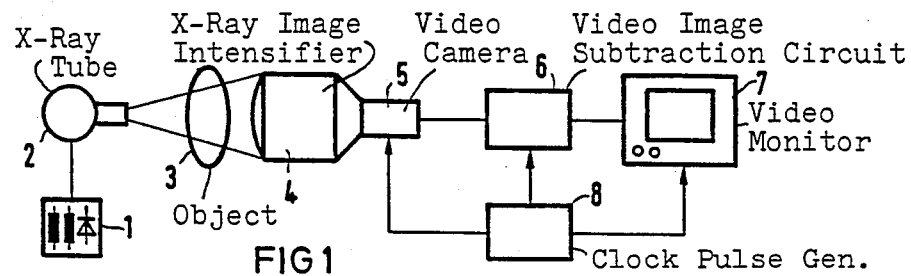
FIG. 1 is a block diagram of the x-ray diagnostic apparatus to which the invention relates.

FIG. 1 shows the x-ray diagnostic apparatus to which the invention relates having an x-ray tube 2 supplied by a high-voltage generator 1, and a patient 3 positioned in the path of the tube's rays.

An x-ray picture converter 4 in the path of the rays behind the patient is coupled to a television camera 5, whose output leads to an image subtraction circuit 6. The output of subtraction circuit is displayed on a video monitor 7. A clock pulse generator 8 synchronizes the chronological functions of the television camera 5, the subtraction circuit 6 and the monitor 7.

Figure 2:
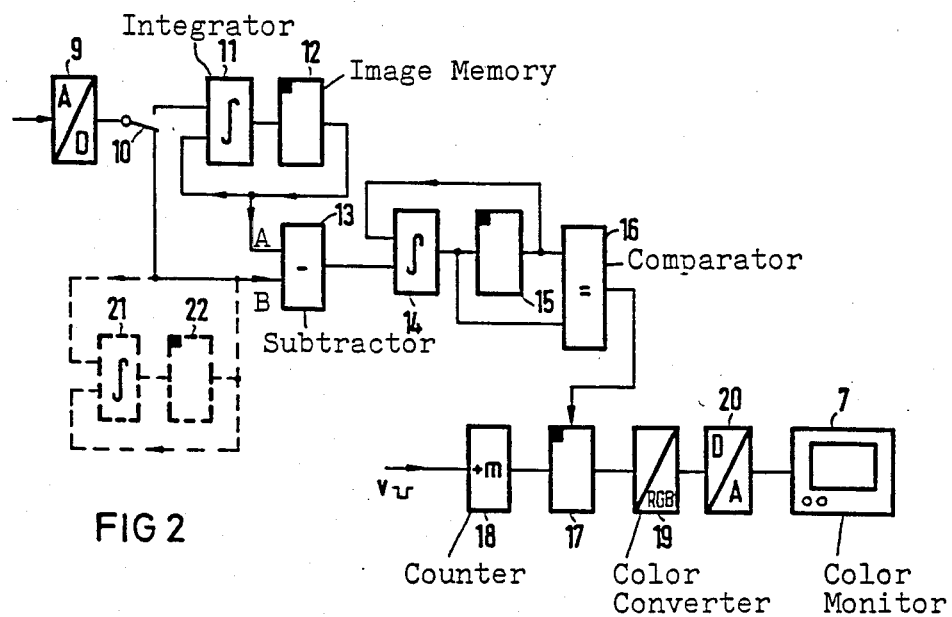
FIG. 2 is a block diagram of the subtraction and evaluation circuits of the x-ray diagnostic apparatus of FIG. 1.

As shown in detail in FIG. 2, the output video signal of the television camera 5 supplied to the subtraction circuit 6 is separated into digital image points in an analog/digital (A/D) converter 9 forming the input stage. The output of the A/D-converter 9 is passed to a selection switch contact 10, which has one switch position leading to a first integration stage 11. The output of the first integration stage 11 is read into a first image memory 12, whose output is fed back into the input of the first integration stage 11, so that an image with reduced noise is stored in the first image memory 12. The second switch position of the selection switch contact 10 is coupled to a difference stage 13, in which the video signal A stored in the first image memory 12 is subtracted from the actual, live video signal B that follows the stored video signal.

The difference signal B-A formed by the subtractor 13 is supplied to a second integration stage 14, whose output is connected to a second image memory 15. The output of the second image memory 15 is fed back into the second integration stage 14. The output signals of the integration stage 14 and the second image memory 15 are compared with each other in a first comparator 16, whose output is passed to a time memory 17. A time counter 18 receiving the vertical sync pulses V of the television camera 5 is connected to the data input of the time memory 17. The output signal of the time memory 17 is fed into a color converter 19; the output of this converter is connected to a digital/analog (D/A) converter 20, whose analog output signal is displayed on the monitor 7, in this case a color monitor.

The difference signal B-A is integrated during the entire radioscopy by the second integration stage 14 and the feedback loop leading through the second image memory 15. The output signals of the second integration stage 14 and the second image memory 15 are compared in the first comparator 16. When the output value of the second integration stage 14 representing an image point is greater than the corresponding image point value of the second image memory 15, a positive signal is produced at the output of the first comparator 16, which triggers a memory process in the time memory 17, so that the numerical value furnished by the time counter 18 is stored in the memory space of the time memory 17 allocated to the corresponding image point. This means that the actual, integrated value of this image point represents a greater image darkening than the stored one. This darkening is produced by the continuous progress of the contrast medium.

When, in contrast, the second image memory 15 furnishes a signal of the same magnitude or greater than the second integration stage 14, i.e., a change caused by the flow of the contrast medium had occurred already or no change took place, a negative signal appears at the output of the comparator 16, which interrupts the storing data in the memory 17. This comparison is instrumental in keeping that value of the time counter 18 stored in the time memory 17 which corresponds to the maximum of the contrast medium flow. These output values of the time memory 17, which characterize the chronological occurrence of the maximum, are converted into color signals in the color converter 19 and fed into the monitor 7 through the D/A-converter 20.

As shown in FIG. 2 in broken lines, the actual image can be largely freed of quantum noise by providing, between the switch contact 10 and the difference stage 13, an additional integration stage 21 and an additional image memory 22. This integration can be achieved through a variable number of images, which conform suitably to the rate of change in the contrast medium flow. Recursive filter circuits may also be used for this purpose in place of the integration stages 11, 14 and 21.

Figure 3:
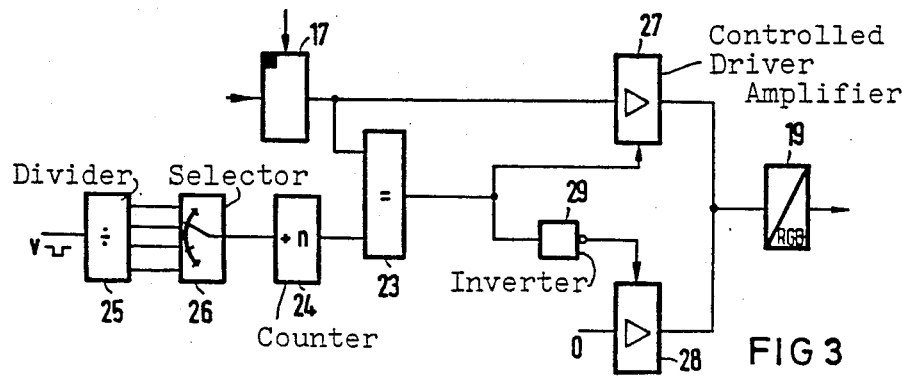
FIG. 3 is a block diagram of the improved circuit according to the invention which is incorporated in the evaluation circuit of FIG. 2.

In FIG. 3, part of the evaluation circuit is shown with the circuit that makes a subsequent dynamic representation of the function possible. A second comparator 23, whose second input is connected to a counter 24, is connected to the time memory 17. Timing pulses derived from the vertical sync pulses V of the television camera 5 by a divider circuit 25 and a coupled selector stage 26 are supplied to this counter 24. The selector 26 makes it possible to select sync pulses with different frequencies. The second comparator 23 is directly connected to the control input of a first controlled driver amplifier 27 and through an inverter stage 29 to the control input of a second controlled driver amplifier 28. The input of the first controlled amplifier 27 is connected to the output of the time memory 17. The input of the second controlled amplifier 28 is set at ground, for example, so that only the value zero appears at its input. The outputs of both controlled driver amplifiers 27 and 28 are connected to the color converter 19.

When the previously described chronological recording of the contrast medium flow has been accomplished, and its values are contained in the time memory 17, the counter 24 is set at zero and subsequently starts to count the timing pulses fed into it. Due to the divider 25, the number of timing pulses may be very much smaller than the number of vertical sync pulses V. The time memory 17 is searched simultaneously for image points at a considerably higher frequency. When the information value of the time memory 17 agrees with the counter setting of counter 24, or when the information value is smaller, the second comparator 23 furnishes a positive signal and these information values are transmitted as image points and displayed on the monitor 7. However, when the information value exceeds the counter setting, the second comparator 23 furnishes a negative signal that switches on the second controlled amplifier 28, via the inverter 29, to reproduce the value zero as a black image point on the monitor 7. Since the setting of the counter 24 increases relatively slowly, an increasing number of image point values of the time memory 17 are reproduced on the monitor 7. At the same time, the different magnitudes of the picture values are converted into different colors so that the contrast medium flow can be recognized on the monitor 7 by the sequentially appearing image points and by their different colors.

The same arrangement also allows a representation of the contrast medium flow on a black and white monitor, if the color converter 19 is omitted. In this case different time values are reproduced as different gray scales. Since some of these gray scales are difficult to distinguish, it is also possible to set a fixed value at the input of the first controlled amplifier 27 (instead of supplying the information stored in the time memory 17 to this amplifier 27) which results, for example, in reproducing of the corresponding image points on the monitor 7 in white. However, this procedure permits only the depiction of the dynamic progression of the contrast medium flow. A chronological representation with a complete picture is no longer possible.

When a picture without contrast medium is stored in the image memory 12 and a corresponding picture with contrast medium is stored in the image memory 22, the output of the difference stage 13 can also be supplied into the first controlled amplifier 27 so that the former's difference signal is transmitted to the monitor 7 in image point form corresponding to the information contained in the time memory. A complete subtraction image can be reproduced dynamically on a black and white monitor by this method.

The selector stage 26 connected to the divider unit 25 can be used to select different divider conditions furnished by divider 25, so that the speed of the dynamic representation of the function pictures of the contrast medium flow can be varied. This makes the slow examination of the relatively fast processes possible as well. It is also conceivable to interrupt the timing pulses supplied to the counter 24 to obtain stationary pictures, or even to provide for a step-by-step manual increase of the counter setting by depressing a button. In the latter case the length of a step may amount to several steps, as desired.

There has thus been shown and described novel x-ray diagnostic apparatus which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the claims which follow.

What is claimed is:

1. In X-ray diagnostic apparatus comprising a video camera for producing a video signal representing the X-ray image of a subject; an image memory for storing said video signal; a subtraction stage coupled to the output of said image memory and said video camera for producing a difference signal representing the difference between the stored video signal and another video signal chronologically following the stored signal; evaluation circuit means connected with said subtraction stage for evaluating time variations in said difference signal and including time memory means for storing information about the chronological progression of a contrast medium used in said subject; and a video monitor coupled with said evaluation circuit means for imaging information stored in said time memory means, the improvement wherein said evaluation circuit means further includes circuit means connected with said time memory means for repeatedly scanning said information stored in said time memory means and switching means connected between said time memory means and said video monitor for passing only those image points from said time memory to said monitor for which the value of said image points fails to exceed an output value from said circuit means, each of said output values being increased step by step above each preceding output value.

2. The X-ray diagnostic apparatus defined in claim 1, further comprising a clock pulse generator connected with and controlling said video camera, said memory means, said subtraction stage and said video monitor, wherein said scanning circuit means includes a counter connected to said clock pulse generator for receiving video timing pulses; a comparator having a first input connected to said counter and a second input connected to said time memory means; and a control stage, having a control input connected to said comparator, for passing image points from said time memory means to said monitor when the value thereof fails to exceed the output value of said counter.

* * * * *